United States Patent
Frantz et al.

(10) Patent No.: US 10,419,281 B2
(45) Date of Patent: Sep. 17, 2019

(54) METHOD AND DEVICE FOR SERVICE PROVISIONING IN A COMMUNICATION NETWORK

(75) Inventors: Michael Frantz, Bad Aibling (DE);
Mladen Milev, Odivelas (PT);
Sandrine Pasqualini, Munich (DE)

(73) Assignee: Xieon Networks S.à.r.l., Luxembourg (LU)

( * ) Notice: Subject to any disclaimer, the term of this patent is extended or adjusted under 35 U.S.C. 154(b) by 441 days.

(21) Appl. No.: 13/990,860

(22) PCT Filed: Dec. 1, 2011

(86) PCT No.: PCT/EP2011/071555
§ 371 (c)(1),
(2), (4) Date: Sep. 17, 2013

(87) PCT Pub. No.: WO2012/072763
PCT Pub. Date: Jun. 7, 2012

(65) Prior Publication Data
US 2014/0003287 A1 Jan. 2, 2014

(30) Foreign Application Priority Data

Dec. 1, 2010 (EP) .................................. 10193378

(51) Int. Cl.
*H04L 12/28* (2006.01)
*H04L 12/24* (2006.01)
*H04L 12/911* (2013.01)

(52) U.S. Cl.
CPC ...... *H04L 41/0806* (2013.01); *H04L 41/5054* (2013.01); *H04L 47/741* (2013.01); *H04L 47/781* (2013.01)

(58) Field of Classification Search
CPC .................................................. H04L 41/0806
See application file for complete search history.

(56) References Cited

U.S. PATENT DOCUMENTS

| | | | | |
|---|---|---|---|---|
| 7,792,931 | B2 * | 9/2010 | Vinberg | G06F 8/65 703/22 |
| 8,051,149 | B2 * | 11/2011 | Hodgson | H04L 41/0806 709/203 |
| 8,082,335 | B2 * | 12/2011 | Mishra | H04L 41/082 709/223 |
| 8,204,981 | B1 * | 6/2012 | Mishra | H04L 41/5009 709/224 |
| 8,478,845 | B2 * | 7/2013 | Agarwala | G06F 9/5061 709/216 |

(Continued)

FOREIGN PATENT DOCUMENTS

WO 12/072763 A1 6/2012

OTHER PUBLICATIONS

International Search Report and Written Opinion for Application No. PCT/EP2011/071555, 11 pages, dated Feb. 23, 2012.

*Primary Examiner* — Guang W Li
(74) *Attorney, Agent, or Firm* — Nelson Mullins Riley & Scarborough LLP

(57) ABSTRACT

A method and a device for service provisioning in a communication network are provided, wherein a resource is utilized in the communication network, which resource is not yet available for productive use by the network. Also, an according communication system comprising at least one such device is suggested.

9 Claims, 11 Drawing Sheets

(56) References Cited

U.S. PATENT DOCUMENTS

| | | | |
|---|---|---|---|
| 8,484,355 B1* | 7/2013 | Lochhead | H04L 41/0806 709/222 |
| 8,732,310 B2* | 5/2014 | Breitgand | G06F 9/45558 370/229 |
| 8,799,431 B2* | 8/2014 | Pabari | G06F 9/5072 709/220 |
| 8,843,922 B2* | 9/2014 | Takahashi | G06F 9/45537 709/223 |
| 2002/0004390 A1* | 1/2002 | Cutaia | H04L 41/0213 455/424 |
| 2002/0091663 A1 | 7/2002 | Mikami et al. | |
| 2003/0189919 A1* | 10/2003 | Gupta | H04L 41/044 370/351 |
| 2004/0105445 A1* | 6/2004 | Wyn-Harris | H04L 47/15 370/395.21 |
| 2004/0186905 A1* | 9/2004 | Young | H04L 41/046 709/225 |
| 2004/0208292 A1* | 10/2004 | Winterbottom | H04L 41/5054 379/15.03 |
| 2006/0031248 A1* | 2/2006 | Vinberg | G06F 8/65 |
| 2007/0043860 A1* | 2/2007 | Pabari | G06F 9/5072 709/224 |
| 2007/0118643 A1* | 5/2007 | Mishra | H04L 41/082 709/224 |
| 2007/0294364 A1* | 12/2007 | Mohindra | G06F 8/61 709/217 |
| 2008/0163171 A1* | 7/2008 | Chess | G06F 9/5077 717/120 |
| 2008/0243993 A1 | 10/2008 | Wang et al. | |
| 2009/0222540 A1* | 9/2009 | Mishra | H04L 41/082 709/222 |
| 2011/0264805 A1* | 10/2011 | Breitgand | G06F 9/45558 709/226 |
| 2011/0302496 A1* | 12/2011 | Pugaczewski | H04L 41/00 715/735 |
| 2012/0042055 A1* | 2/2012 | Agarwala | G06F 9/5061 709/220 |

* cited by examiner

METHOD AND DEVICE FOR SERVICE PROVISIONING IN A COMMUNICATION NETWORK

RELATED APPLICATIONS

This application is a 35 U.S.C. 371 national stage filing of International Application No. PCT/EP2011/071555, filed on Dec. 1, 2011, which claims priority to European Patent Application No.: 10 193 378.6, filed on Dec. 1, 2010. The contents of the aforementioned applications are hereby incorporated by reference.

The invention relates to a method and to a device for service provisioning in a communication network.

A communication network comprises nodes and links, the nodes processing, switching, and distributing communication traffic, e.g. data traffic, between the links of the network, and control entities for controlling and managing the traffic in the network and the services provided by the network. Services may use control, processing, switching and transmission resources, which may be combined to form e.g. communication channels used by the services to convey information from one point to another point in, or at the edge of, the network, or across network boundaries towards other networks.

Networks may be physical networks, i.e. be built on and directly using physical resources, or virtual networks, i.e. using resources extracted from one or more physical networks and combined and allocated to form a virtual network.

Networks may be built using different technologies based on physical or virtual infrastructures. A typical physical infrastructure is based on optical fibers, each fiber with the capability of carrying a multiplicity of different wavelength channels (Wavelength Division Multiplex (WDM) or Dense WDM (DWDM)). Virtual infrastructures may use IP/MPLS tunnels or any other kind of suitable technologies. The list of technologies mentioned shall not be considered as limiting or exhaustive.

For a network, e.g. an aggregation or transport network based on e.g. DWDM technologies, an overall service provisioning process comprises network planning, ordering of equipment required, installing of the ordered equipment, allocating required resources to requested services in the network, and creating and activating of the services in the network. In many cases, when being initially installed, the network is not pre-equipped with all kinds of resources potentially required for additional services that may be requested at a later stage, in particular because of the high costs of optical equipment for the DWDM network. Hence, the network often is upgraded at a later stage when the service to be provided is promising with regard to a contemporary return-of-investment.

The overall service provisioning process may require some time before the service to be installed is actually available to the users. For example, between the planning stage and the installation stage there can be several months, in particular if new equipment is required, has to be ordered, mounted and configured.

It is noted that an additional service to be installed may require resources that may at least partially exist in the network, whereas other resources need yet to be ordered and installed. It may also be a problem that not all equipment (providing resources) can be installed at the same time, i.e. the installation process itself may be spread over several days or weeks. This further increases the delay until the service requested is made available by the network.

When a new service is planned by a planning tool, it has to be guaranteed that the resources required are, at the point of time when all resources are finally installed, available to activate the dedicated service. If the resources are in the meantime used for other services or restoration purposes, the service can not be activated in time and another planning cycle is required, which may again cause several months delay for the provisioning of the service to the network's customers.

In an existing solution, all resources required for a service have to be installed and available before the service can be activated. Services are activated by a management plane (Network Management System (NMS) or Control Plane (CP)) only if all resources are already installed and available in the network. Hence, it is not possible to create service related connections, e.g. a cross connection (CC), based on required physical or virtual resources, which are not yet installed or available.

It is thus an object of the invention to provide an efficient solution to allow for a service to be supplied in a network in a fast, economic, and reliable manner.

The object is achieved by a method for service provisioning in a communication network, wherein a resource is utilized in the communication network, which resource is not yet available for productive use by the network.

In a first embodiment such a resource may be a physical resource, which is not yet installed, or a virtual resource, which is not yet assigned for usage by the network.

In another embodiment such a resource may still be in use with another service of the same or a different network.

Hence, it is a significant advantage to already claim, occupy and/or reserve resources in the network, even if the resources are not yet available for productive usage by the network. As soon as such a resource becomes available, the service associated with this resource can be activated without (significant) delay and without further control or management interaction. Hence, the physical delivery and installation, or a respective assignment of the resources, are sufficient to run the service based on said resource.

By utilizing the resource, said resource can be, e.g., created, reserved, allocated and/or virtualized. Such activities comprise e.g. that the resource is materialized as a database entry and/or labeled and marked according to its respective designation.

Productive use or usage of a resource by the network stands for any usage within the purpose of the network and/or the purpose of the service, e.g. when the network provides and configures the technical means to enable the user to receive the requested service.

This approach can in particular be utilized for upgrading the communication network.

The solution provided can be used in the field of optical networks, i.e. DWDM networks, for service planning and activation purposes.

The solution can further be used with virtual networks, when service planning or actual service requests exceed the current network capabilities.

The solution presented bears the advantage that the resources required for a service can actually be allocated for said service. It can thus be efficiently ensured that the resources needed for such service are not accidentally used by another service or otherwise utilized by a control plane. Hence, the service can automatically be activated by the network, or a related network element, as soon as all resources (in particular the equipment providing the resources) are installed and available.

This is in particular advantageous with regard to optical or DWDM networks in which it may not suffice to merely consider a free capacity within the network, but to ensure an actual availability of dedicated wavelengths, because end-to-end paths may work for one wavelength but not for a different wavelength. Hence, exactly the resources (wavelength), which have been planned for a particular service, can be allocated and reserved and after installation and activation be used.

Most of the further embodiments and implementation options are described focusing on physical resources in physical networks only. However, it is emphasized that this is not to be considered as limiting the scope of further embodiments to physical network implementations and related physical resources only. A person reasonably knowledgeable in the art can easily read from the related descriptions the equivalent teaching for virtual network applications.

In an embodiment, several resources are utilized in several network elements of the communication network, wherein at least one resource of the several resources is not yet physically available.

Hence, the allocation due to a demand can result in utilization of available and not yet available resources. The missing resources can be ordered and after delivery and installation the whole set of resources reserved can be used for the new service.

It is further noted that several resources may be utilized, e.g., virtualized and/or reserved, that are not yet available. In particular one or several resources per network element can be utilized in this regard.

In another embodiment,
a service is configured based on a request; and
based on the service configuration the resource is utilized.

Hence, the request may lead to a configuration of a service and thus to said utilization of the resource.

In a further embodiment, an order equipment request is issued based on a physical resource identified as being not available.

In a next embodiment, upon delivery of the equipment ordered,
the equipment is installed; and
the service is activated.

Hence, the service can become active as soon as the resource is provided by the equipment ordered, delivered and installed.

In another embodiment a request for provisioning of a virtual resource is issued based on a virtual resource identified as being not available.

In a next embodiment, upon provisioning of the virtual resource requested,
the virtual resource is configured in the communication network; and
the service is activated.

It is also an embodiment that the resource is configured via a system database.

Advantageously, the system database can be an entity collecting information from various components (or functions) of the network and make information available to all such components or a portion thereof. The system database can be regarded as an information platform for (some of) the components of and around of the network, e.g., for a planning tool and/or an ordering tool. It is noted that the system database can be implemented as a central database functionality or as a distributed database functionality. Also mixtures of central and distributed database functionalities are possible. It is further noted that the system database (or a portion thereof) may also be provided in at least one of the components of or around of the network, such as, e.g., in the planning tool.

The system database may obtain an actual status of the system (e.g., network elements and/or components of the network or a portion thereof) and the status of the target system considering the resource yet to be provided (e.g., the system after the at least one new equipment is installed and activated). The system database may comprise data about the resource, the equipment and configuration data to operate the equipment once it is delivered and installed. The system database may in particular provide a functionality (e.g., via a controller or via a controlling device) to activate the resource once it is available.

Pursuant to another embodiment, upon availability of the resource, the entry of the system database regarding this resource is used to configure and activate the installed equipment.

According to an embodiment, the request depends on a demand.

Such demand may result from a given network topology, a related network capability and/or a traffic demand. A planning tool may reveal such demand, e.g. by insufficient network capabilities in view of the traffic demand, and thus issue said request. The demand can be identified (e.g., by the network planning tool) using actual or projected network configuration and/or real time measurement results, simulation techniques based on measurement results, forecasts or estimates of traffic demand, etc. The demand can be used to identify a need for an upgrade.

Advantageously, the process chain provided can be fully (or partially) automated from the identification of the demand down to the commissioning of related resources in the (upgraded) network.

It is noted that such demand may cover physical equipment and/or virtual resources.

According to another embodiment, the resource may comprise at least one virtual resource.

Hence, virtual cross connections can be configured via said virtual resources. Advantageously, such virtual cross connections can be activated immediately after the resource(s) is (are) physically available (i.e., installed and "switched on"). It is another advantage that no further interaction with the management plane is required.

The problem stated above is also solved by a device comprising or being associated with a processing unit that is arranged
for utilizing a resource in a network element of the communication network, which resource is not yet available to the network.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

According to an embodiment, said device comprises a system database of the communication network.

The problem stated above is also solved by a network component of a communication network
comprising a processing unit arranged such that an equipment is configured after delivery of the equipment based on data stored in a database,
wherein the data stored in the database is based on a resource previously utilized by at least one network element of the communication network.

According to an embodiment, the database is at least partially located in the network component.

According to a further embodiment, the database is a distributed or a centralized database of the communication network.

Furthermore, the problem stated above is solved by a communication system comprising at least one device as described herein.

Figure 1:
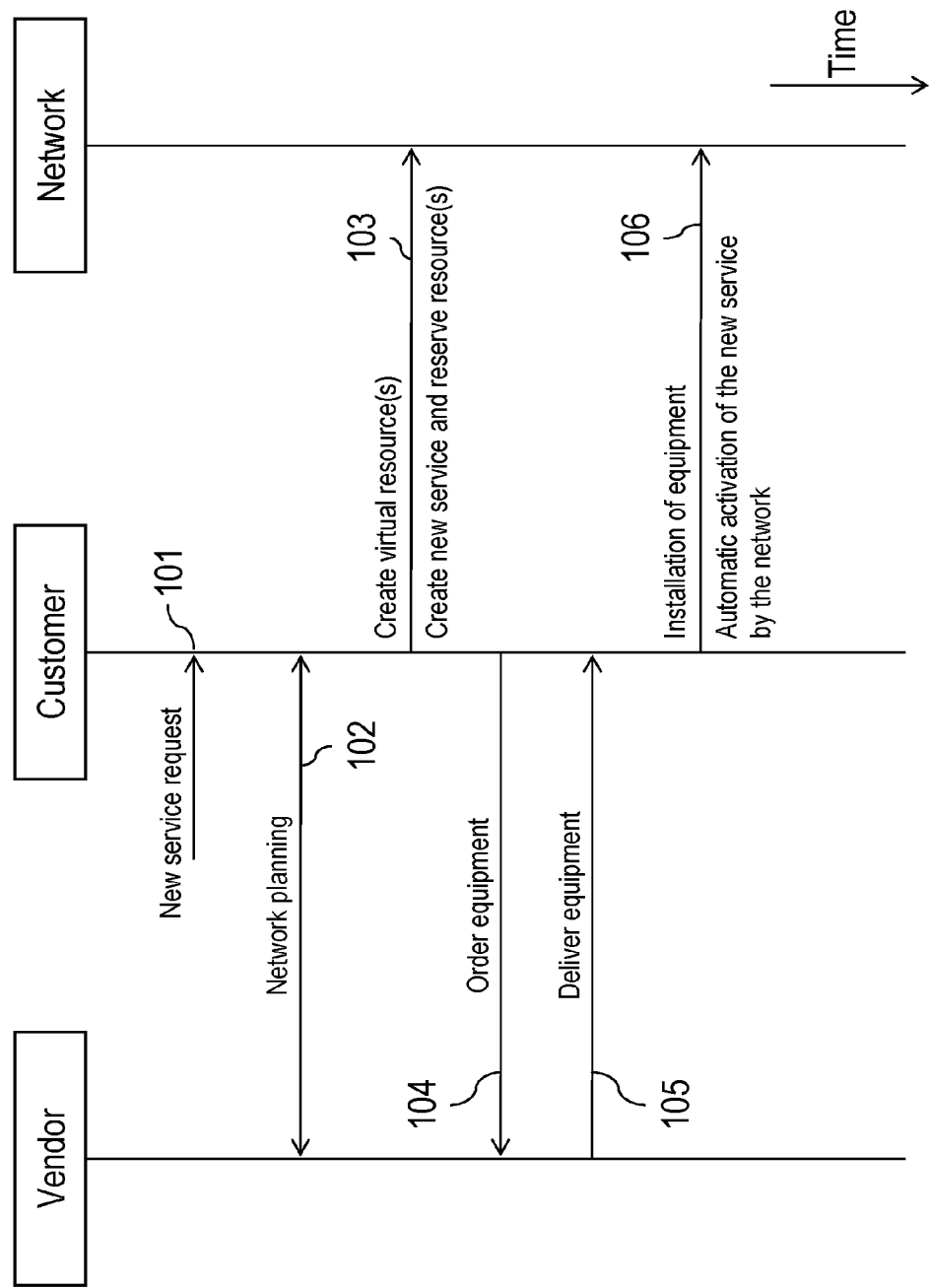
FIG. 1 shows a schematic diagram visualizing an example of an improved service provisioning, which allows reserving virtual resources for dedicated services and resolving a conflict of usage between a network management system and a control plane.

For an optical network, a network management system (NMS) and a generalized multi protocol label switching (GMPLS) control plane (CP) can be used concurrently for service activation and restoration purposes. In both such management planes, the provisioning is performed in a two-step approach, i.e. creation of the service and activation of the service. Both operations can be performed at different points of time. In the NMS the service is defined as a service and/or path, which can be created and activated. In the CP the service is represented as a call, which can have an "activationState" being "inactive" (i.e. created) and "activationState" being "active" (i.e. activated). When the service (path or call) adopts the state created, the resources which are required for a service are reserved in an NMS data base (DB) or in a DB of the CP instance at an ingress node. The resources are still free to be used in the network. So far, neither the NMS nor the CP reserves resources in the network elements (NEs), they just use it by switching cross connections (CCs) when the service is activated.

The solution provided herein allows reserving virtual resources for a dedicated planned service in the network or network element (NE).

After a service is planned, the virtual resources can be created in the network, i.e. in the network element. After the virtual resources are created in the network, the virtual resources can immediately (in particular with no or short delay) be used for service creation and virtual activation purposes by the NMS and/or the CP. The NMS may not only use the resources for a service when the service is activated, but can reserve the virtual resources in the network already when the service and/or path are created in the NMS. Accordingly, the (distributed) CP reserves the resources when the call is created (even if the "activationState" is "inactive") via signaling means.

The service specific reservation of virtual resources in the network or network element (NE) may consider at least one of the following features (1) Planned resources to be installed can be created in the network element (NE) as a virtual resource and reserved for a dedicated service in the NE.

(2) In addition, service specific data can be stored in the NE for virtual resources (as well as for installed resources), e.g., the service name, to allow better network supervision for an automated provisioning process via a GMPLS control plane and a better maintainability, e.g., a possibility to clean-up the network in case an operation was not successfully executed or terminated.

(3) Virtual resources can be presented to the NE interface in the same way as installed resources, but with a different state expressing the fact that a resource is only virtually available. Hence, virtual resources can be handled by the NMS as installed resources. There may be no extra functionality required for handling virtual resources. As an option, additional concepts with added value for the customer can be provided by such an information, e.g., preparing planned services for an activation that is scheduled at a later point in time and/or for an automatic activation.

(4) Virtual cross connections (CCs) can be created using virtual resources. These virtual CCs can be immediately activated by the NE as soon as all required resources are installed. There may be no further action required from any management plane.

(5) The NMS reserves virtual resources for a planned service in the network, i.e. in the NE, when the service is (being) created. In this case, the NMS reserves the virtual resources not only in its DB, but accesses the network when the service is created and does not only use the resources when the service is activated (by switching said CCs). This allows the concurrent service provisioning and restoration by the NMS and the distributed CP instances to be conducted on the same pool of resources. In addition, the service identifier (e.g., service name) is set for the resources (installed and virtual resources) which are used for the planned service.

(6) The CP reserves resources via signaling for inactive calls, wherein it is noted that a call may implement a service request to the GMPLS control plane; resources required for pre-planned restoration.
(7) The resource reservation is notified to the NMS and to the distributed CP instances.

FIG. 1 shows a schematic diagram visualizing an example of an improved service provisioning, which allows reserving virtual resources for dedicated services and resolving the usage conflict between the NMS and the CP.

In the exemplary scenario shown in FIG. 1, in a step 101a new service request is launched for a customer (here the "customer" in particular relates to a device or NE at the customer's premises). It is noted that the service creation can be triggered by the NMS and/or the CP. The service request 101 can be generated by any entity of or utilizing the network.

A network planning step 102 may be conducted between the customer and the vendor, in particular by the vendor to utilize the resources for the new service in an efficient manner.

In a step 103, based on the result of step 102, virtual resources are created and the new service is created and associated resources for the service are reserved between the customer and the network.

Next, in a step 104, the new equipment identified to be required for the new service is ordered. The customer may indicate such an order to the vendor.

A step 105 visualizes a delivery of the ordered new equipment and a step 106 indicates that the new equipment is installed and an automatic activation of the new service can be conducted between the customer and the network based on the preliminary activities in step 103.

This approach in particular bears the advantage that planned services can be implemented in the network in time. This leads to a reduced amount of operational expenditure (OPEX) and may render an additional planning cycle dispensable. It is another advantage that resources do not have to be split into separate domains for the NMS and GMPLS control plane, which reduces the capital expenditure (CAPEX).

Furthermore, services can automatically be activated by the network and/or the NE when all resources are installed and available without any action from a management plane (NMS or GMPL control plane), which also leads to reduced OPEX.

The services planned can yet be configured via creation and activation without the need to consider unwanted side effects between the NMS and the GMPLS control plane. In addition, no separate tool is required to administrate the virtual resources; hence the network may act as a master instance in this scenario. These advantages further reduce the amount of OPEX.

Hence, the approach presented herein relates in particular to two independent systems, i.e. said NMS, providing, e.g., infrastructure services, and said CP, handling, e.g., user "calls". Both systems concurrently contend for network resources.

More specifically the issue of pre-reservation of resources for planned services, even in the case when the required physical resources are not yet (completely) provisioned, is an applicable scenario.

The solution in particular manages and reserves virtual resources in the NE, wherein none yet existing physical resources are utilized, in particular virtualized and/or reserved. These physical resources are to be materialized and commissioned for service at a later time.

Resources and/or service information can be pre-configured in a database and automatically utilized (i.e. configured, installed and/or commissioned) when the required equipment or resource becomes available.

Hence, it is also suggested to provide a solution for upgrading the network.

Figure 2:
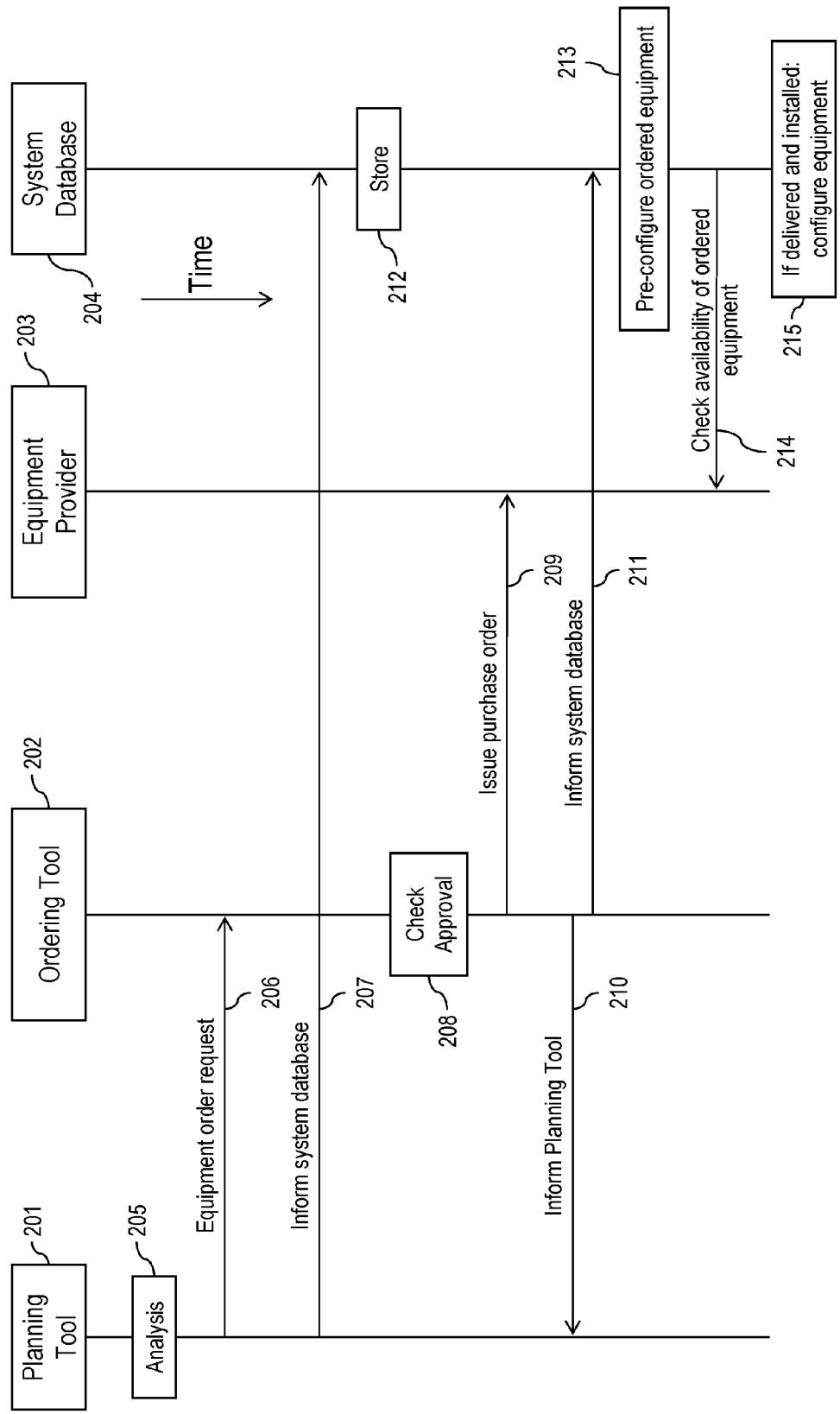
FIG. 2 shows a schematic message diagram comprising a (network) planning tool, an ordering tool, an equipment provider and a system database.

FIG. 2 shows a schematic message diagram comprising a (network) planning tool 201, an ordering tool 202, an equipment provider 203 and a system database 204.

Hence, the network planning tool 201 may be capable of performing in particular at least one of the following steps:
(a) Performing an analysis of a demand that may be based on a network topology, network capabilities and a traffic demand. If such analysis reveals an according demand, at least one equipment order request will be issued (step 205).
(b) The at least one equipment order request is delivered to an equipment ordering tool (message 206).
(c) A system database is informed about a target network topology and capabilities of this network (e.g., including the demand recorded and/or the request issued) as shown in a message 207.

Also, the equipment ordering tool 202 may be capable of conducting at least one of the following steps:
(a) Receiving the equipment order request from the network planning tool (according to the message 206);
(b) Checking whether such equipment order request can be approved (step 208); in case the equipment order request is approved: continue with next step;
(c) Create and (optionally automatically) deliver a related purchase order to an equipment provider (message 209);
(d) Convey the information that the equipment order request has been approved and a purchase order has been created (and delivered) to the network planning tool (message 210);
(e) Convey information about the ordered equipment to the system database (message 211).

Further, the system database 204 may comprise various information in particular accessible to the entities described herein. The system database 204 may comprise the status of the actual system, the status of the target system (after the new equipment will be installed and activated, hence the status of the target system after it will be upgraded to provide the additional service), data regarding the ordered equipment, configuration data regarding the ordered equipment. The system database 204 may be configured to (optionally) share its information with the network planning tool. The system database 204 may in particular comprise a controller that is capable of performing at least one of the following steps:
(a) Receiving the target network topology and its capabilities and storing this information in the system database (message 207 and a step 212);
(b) Receiving information about the ordered equipment from the equipment ordering tool and pre-configuring the ordered equipment in the system database (message 211 and a step 213);
(c) Monitoring an (expected) availability of the ordered equipment (indicated by a message 214 sent to the equipment provider 203; this message can be sent iteratively to become aware of the delivered equipment);
(d) Upon delivery and installation of the ordered equipment (e.g. power-on of a component or device, plug-in of a line card, plug-in of a link cable, etc.), automatically configuring this equipment based on the pre-configured information stored in the database and commissioning this equipment to be used by services (see step 215).

Hence, a network planning process, an equipment ordering process, an installation process and a resource commissioning process are provided, which could be used to form a widely automated network upgrading procedure. A "demand" can be identified by the network planning tool, using, e.g., actual or projected network configuration and/or real time measurement results, simulation techniques based on measurement results, forecasts or estimates of traffic demand, etc. The demand can be used to identify a need for an upgrade. The process chain provided can be fully (or partially) automated from the identification of the demand down to the commissioning of related resources in the upgraded network. Advantageously, two (external) events are used for continuation and completion of the process, i.e. the approval of equipment orders (which can be achieved, e.g., by manual confirmation (clicking a button) or based on previously stored information) and the actual installation of the delivered equipment (which could be done manually, e.g., by plugging-in a device).

It is noted that the network could be a virtual network; hence, the term demand is not restricted to any physical equipment, but may as well comprise virtual resources, e.g., a (MPLS) path etc. Hence, the equipment order can be a resource order, the resource to be provided by a related (manual or preferably automated) installation or configuration procedure, wherein the virtual resource can be handled in the same way as the physical resource (equipment, device). The solution presented thus applies to an upgrade of a physical and/or a virtual network, wherein the resources may be physical or virtual resources and the equipment ordering tool may be a resource management tool etc.

Hence, the term "demand" can also be understood as a need of whatever kind of physical (e.g., equipment-based such as a link, a node, a channel, a (raw) bandwidth, a wavelength, etc.) or logical (or "virtual") resource (e.g., a path, a path capability, etc.). It is noted that a demand for a virtual resource may include but does not require a demand for a physical resource (although the physical resource may be available, it may not be allocated to be used in the virtual network). The same applies vice versa, i.e. the demand for a physical resource may include but does not require a demand for a virtual resource.

Accordingly, for the virtual network, the equipment ordering tool could be a resource management tool, which (depending on the availability of required physical resources and/or other policies) could provide the requested virtual resources either immediately or based on a separate approval. An equipment order request could be triggered immediately or via a back-loop through the network planning tool of the underlying physical network to the equipment ordering tool in case such physical resources would not be available. It is noted that in particular in case of the physical resources being available, the process chain can be completed for a virtual network without any human intervention.

In both cases (physical and virtual network), the network configuration is upgraded and as a result of the procedure the upgraded network can be in operation and useable for at least one service.

A process of providing or building a communication network comprises in particular (at least a portion of) the following steps:

(1) A network topology and/or a traffic demand is/are planned, e.g., utilizing a software model in a planning tool.
(2) Equipment that might be necessary is simulated, e.g., via a software model in the planning tool.
(3) The planning tool may create an equipment order request.
(4) An approval or a decline of the equipment order request is awaited.
(5) If the equipment order request is approved, equipment is ordered, e.g., via an external application.
(6) The approval of the equipment order request is communicated.
(7) The approval of the equipment order request is entered in the software model (e.g., by storing or updating an entry in a database).
(8) If the equipment order request is declined in step (4) above, the process of planning may be interrupted.

The steps (6) and (7) are in particular advantageous to maintain an up-to-date software model (e.g., database) of the physical communication network and for correctly executing upgrades.

It is noted that the steps starting with step (1) may be conducted one after the other and after step (7) it may be continued with step (1).

Advantageously, the step (6) utilizes an electronic interface for communication allowing for an automated information exchange without involving manual support. It is also an advantage if step (7) can be conducted in an automated fashion by utilizing appropriate electronic interfaces between the ordering tool and the planning tool.

Hence, it is an option to provide an inventory ordering protocol by introducing two pieces of information (e.g., as fields, shelves or slots). The protocol can be used between the electronic planning tool and the ordering tool. Based on such protocol, the process can be utilized in an automated manner without the requirement of human interaction.

The protocol suggested may utilize the following content or attributes:

(a) A serial number (SRN), i.e. a unique item type identifier regarding a type of equipment and optionally a version of the ordering tool.
(b) A description for the equipment to be ordered.
(c) An item number (Item-No) that may indicate the unique item regarding type of equipment and version of the manufacturer.
(d) A node name identifies the node (or NE) where the equipment ordered is to be deployed.
(e) A shelf indicating a number of a shelf where the equipment ordered is deployed.
(f) A slot indicating the number of slot where the equipment ordered is to be placed.

The protocol suggested may utilize the attributes mentioned above. An implicit meaning can be associated with each unit in a file conveyed via the protocol. Also, a minimum number set of attributes can be defined, which allows identification of a single item (equipment) in the network element installation; in such case, no further means to uniquely identify the item are required.

The attributes mentioned above are exemplary and could be adjusted or supplemented depending on the respective scenario or use-case.

It is noted that in particular attributes (d) to (f) help to identify a location of the equipment to be upgraded (in particular replaced or added). Hence, a technician by utilizing this information can easily reach the exact spot or position where the equipment needs to be installed.

The process of providing or building a communication network can be modified to comprise in particular (at least a portion of) the following steps:
(1) A network topology and/or a traffic demand is/are planned, e.g., utilizing a software model in a planning tool.
(2) Equipment that might be necessary is simulated, e.g., via a software model in the planning tool.
(3) The planning tool may create an equipment order request.
(4) An approval or a decline of the equipment order request is awaited.
(5) If the equipment order request is approved, equipment is ordered, e.g., via an external application.
(6) An inventory ordering report can be (automatically) imported.
(7) An installation of the equipment can be (automatically) entered in the software model (e.g., by storing or updating an entry in the database).
(8) If the equipment order request is declined in step (4) above, the process of planning may be interrupted.

This also emphasizes as how an additional degree of automation can be reached. By providing such higher degree of automation, the process becomes less error-prone, in particular less susceptible to human errors.

Figure 3:
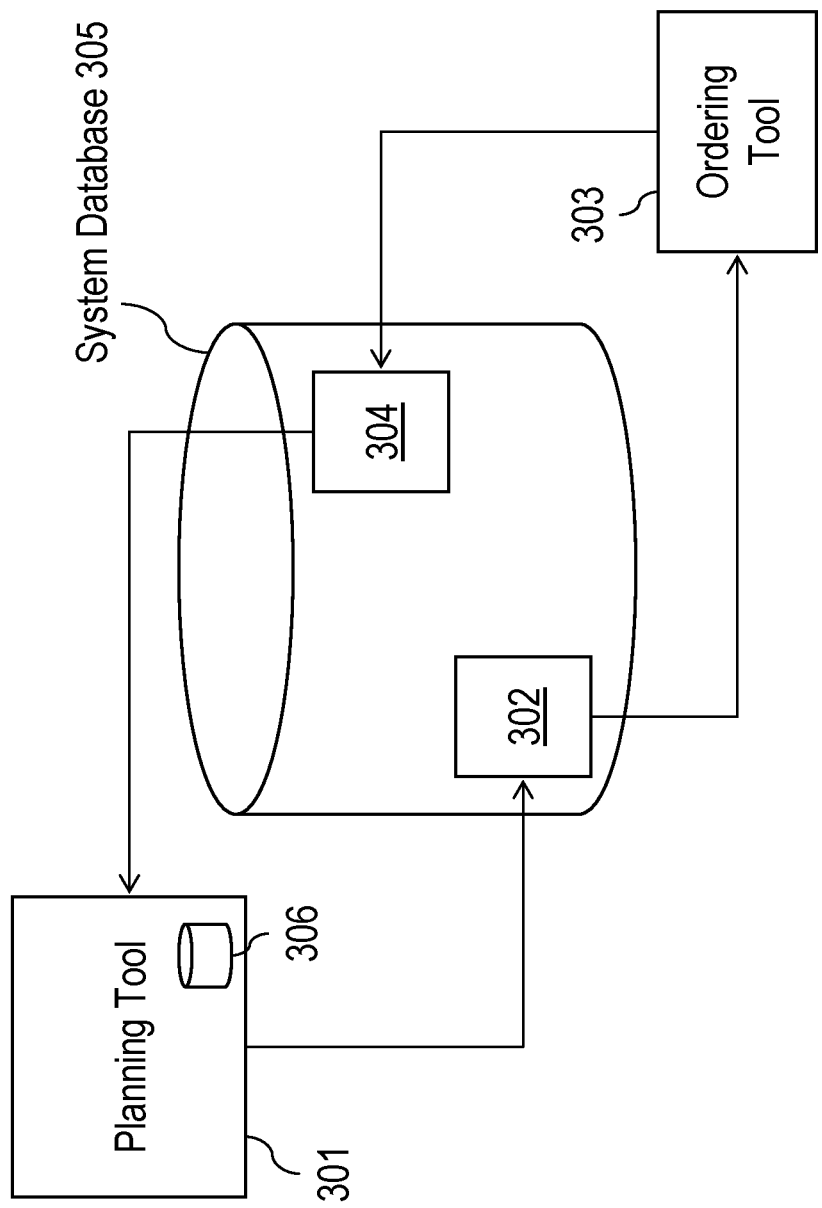
FIG. 3 shows a schematic block diagram which describes the process of upgrading a network utilizing a high degree of automation and minor or no involvement of an actual person.

FIG. 3 shows a schematic block diagram which describes the process of upgrading a network utilizing a high degree of automation and minor or no involvement of an actual person.

A planning tool 301 provides (exports) an inventory report 302 that needs approval. This inventory report 302 can be stored in a system database 305 and is imported by an ordering tool 303. Based on predefined and stored rules or knowledge, the inventory report 303 imported is assessed and an (automated) decision whether or not to approve this report 303 can be made. As an alternative or in addition to that, the decision may be made with some input from an operator (e.g., via the ordering tool 303). A copy of the imported and approved inventory report (or a portion thereof) 304 is exported (e.g. to the system database) and can be imported by the planning tool 301 to become aware of the order result.

It is noted that the planning tool 301 may comprise a database 306. This database 306 can be redundant to (at least a portion of) the system database 305. The database 306 may also contain additional information. As indicated, the system database 305 (considering also the database 306) can be provided as decentralized database. It is also an option that only one centralized system database 305 is available.

Based on the protocol suggested, the inventory report used for ordering can also be considered as already being "approved" and it can be imported by the planning tool and trigger a procedure to automatically change a state of the equipment mentioned in such report.

Hence, the solution provides a protocol for electronic exchange of information between the ordering tool and the planning tool without any requirement for further human intereaction.

The report mentioned herein could be provided in various formats, e.g., plain ASCII text with commonly used separators (comma, tab, etc.), XML, in a tabular format. The report can be conveyed as an electronic file.

The report can be conveyed via any means via a physical layer or medium, e.g., via email, TCT/IP connection, off-line delivery, push or pull mechanisms, etc. The report (conveyed as, e.g., a file) can be transparent or encrypted.

Figure 4:
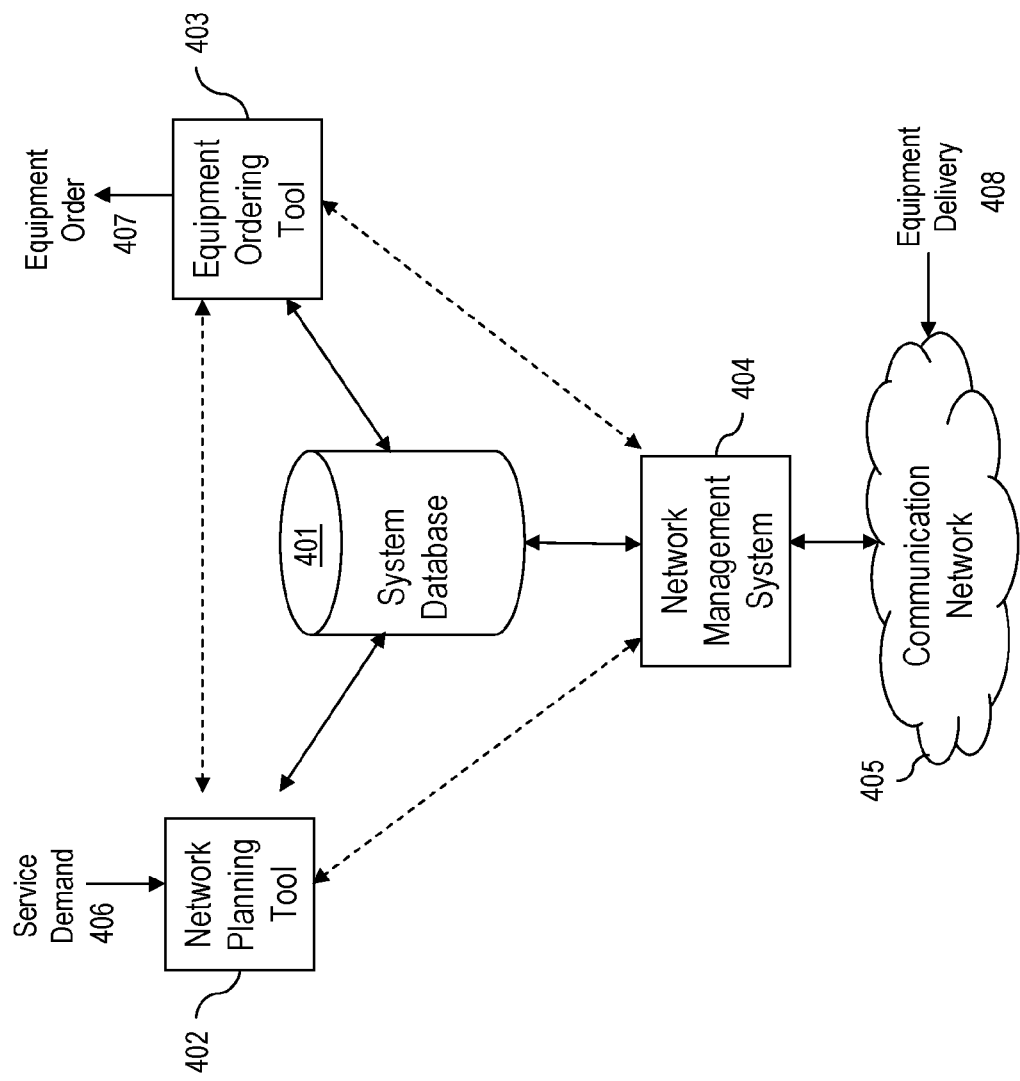
FIG. 4 shows a network planning tool, an equipment ordering tool and a network management system sharing a system database.

FIG. 4 shows a network planning tool 402, an equipment ordering tool 403 and a network management system 404 sharing access to a system database 401. The network management system 404 is connected to physical entities of (a part of) the communication network 405 (which will be visualized in FIG. 8). The network planning tool 402, the equipment ordering tool 403 and the network management system 404 have direct access to said system database 401 and may (e.g., optionally) also be connected with each other (indicated by the dashed lines in FIG. 4).

A service demand 406 may be conveyed to the network planning tool 402. Such service demand 406 can be based on a change request that requires the communication network 405 to be upgraded and/or extended. The demand could be a traffic model fed to the network planning tool 406, which determines (based on an actual status of the network provided by the system database 401) as how the communication network should be (physically) changed. The physical change may comprise an upgrade or downgrade and/or provisioning of physical resources (e.g., nodes, line cards, equipment and devices of all kind, in particular components added to existing network elements).

The equipment ordering tool 403 based on the information available from the system database 401 may trigger an equipment order 407. The equipment will be delivered and added (see arrow 408) to the communication network 405, which leads to an equipment delivery notification from a network element of the communication network 405 to the network management system 404, which updates the system database 401 accordingly.

The system database 401 in FIG. 4 can be used as a common knowledge base for the network planning tool 402, the equipment ordering tool 403 and the network management system 404.

Figure 5:
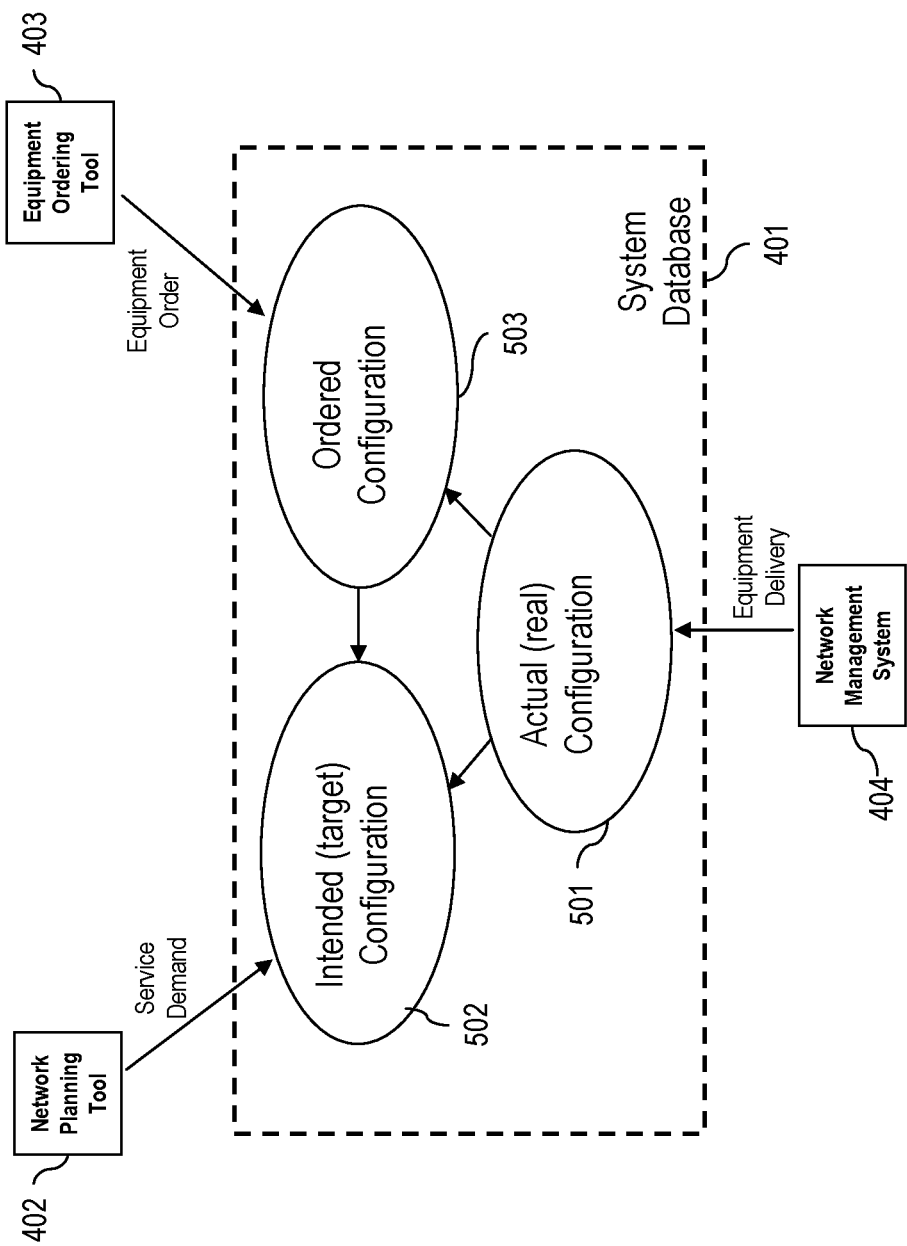
FIG. 5 shows a schematic diagram visualizing an exemplary implementation of the system database comprising several views, i.e. an actual (real) configuration, an intended (or target) configuration and an ordered configuration.

FIG. 5 shows a schematic diagram visualizing an exemplary implementation of the system database 401 comprising several views 501 to 503, i.e. an actual (real) configuration 501, an intended (or target) configuration 502 and an ordered configuration 503.

The network planning tool 402 may determine a service demand (e.g., physical equipment to be provided), e.g., based on a traffic information, a load situation or a traffic model (traffic matrix), which could be supplied by an operator or by the communication system itself, and stores it in the intended configuration 502. This view 502 may be based on the actual, ordered but not yet installed configuration of the network. It is noted that the view 502 may also comprise equipment that is to be ordered, but the order has not yet been approved.

The equipment ordering tool 403 may issue an equipment order and update the ordered configuration 503 of the system database 401. This view 503 comprises the equipment ordered, but not yet installed. The update of the ordered configuration 503 leads to an update of the intended configuration 502, because this view 502 also comprises the ordered configuration 503.

The network management system 404 may indicate an equipment delivery event to the actual configuration (view) 501 of the system database 401. This information is used to also update the intended configuration 502 and the ordered configuration 503 (because the equipment installed can be deleted in views 502 and 503).

Figure 6:
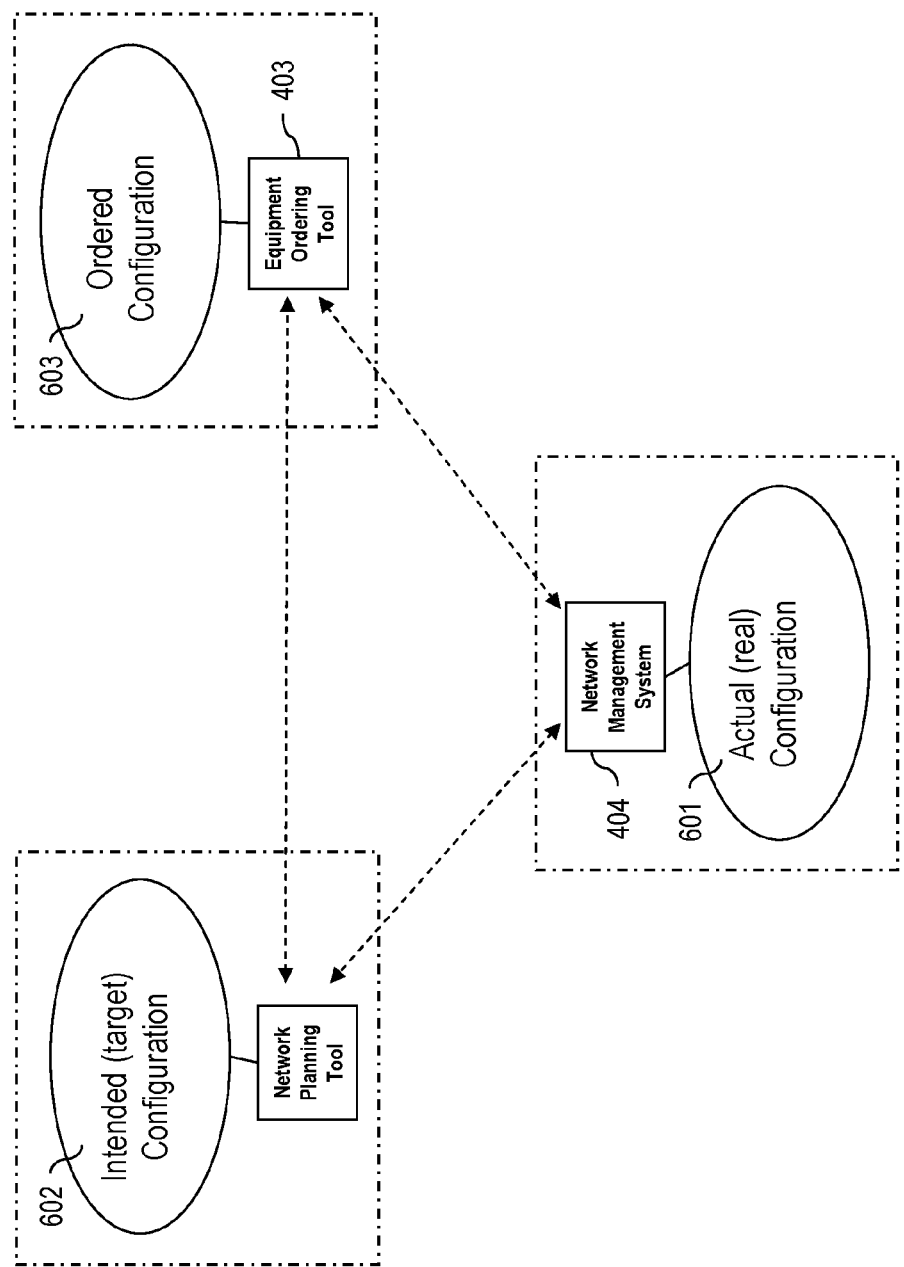
FIG. 6 shows a schematic diagram visualizing an alternative implementation compared to FIG. 5, wherein the system database, in particular the views 501 to 503 shown and explained with regard to FIG. 5, is/are distributed among the network planning tool, the equipment ordering tool and the network management system as separate databases.

FIG. 6 shows a schematic diagram visualizing an alternative implementation compared to FIG. 5. In this scenario, the system database, in particular the views 501 to 503 shown and explained with regard to FIG. 5, is/are distributed among the network planning tool 402, the equipment ordering tool 403 and the network management system 404.

Hence, the network planning tool 402 is associated or comprises and maintains an intended configuration database 602. As described above, the database 602 also requires updates from an ordered configuration database 603 associated with and maintained by the equipment ordering tool 403 and from an actual configuration database 601 associated with and maintained by the network management system 404. The database 603 also requires updates from the actual configuration database 601. All updates of the databases are provided by the network planning tool 402, the equipment ordering tool 403 and the network management system 404 via communication channels as indicated by the dashed lines in FIG. 6.

Figure 7:
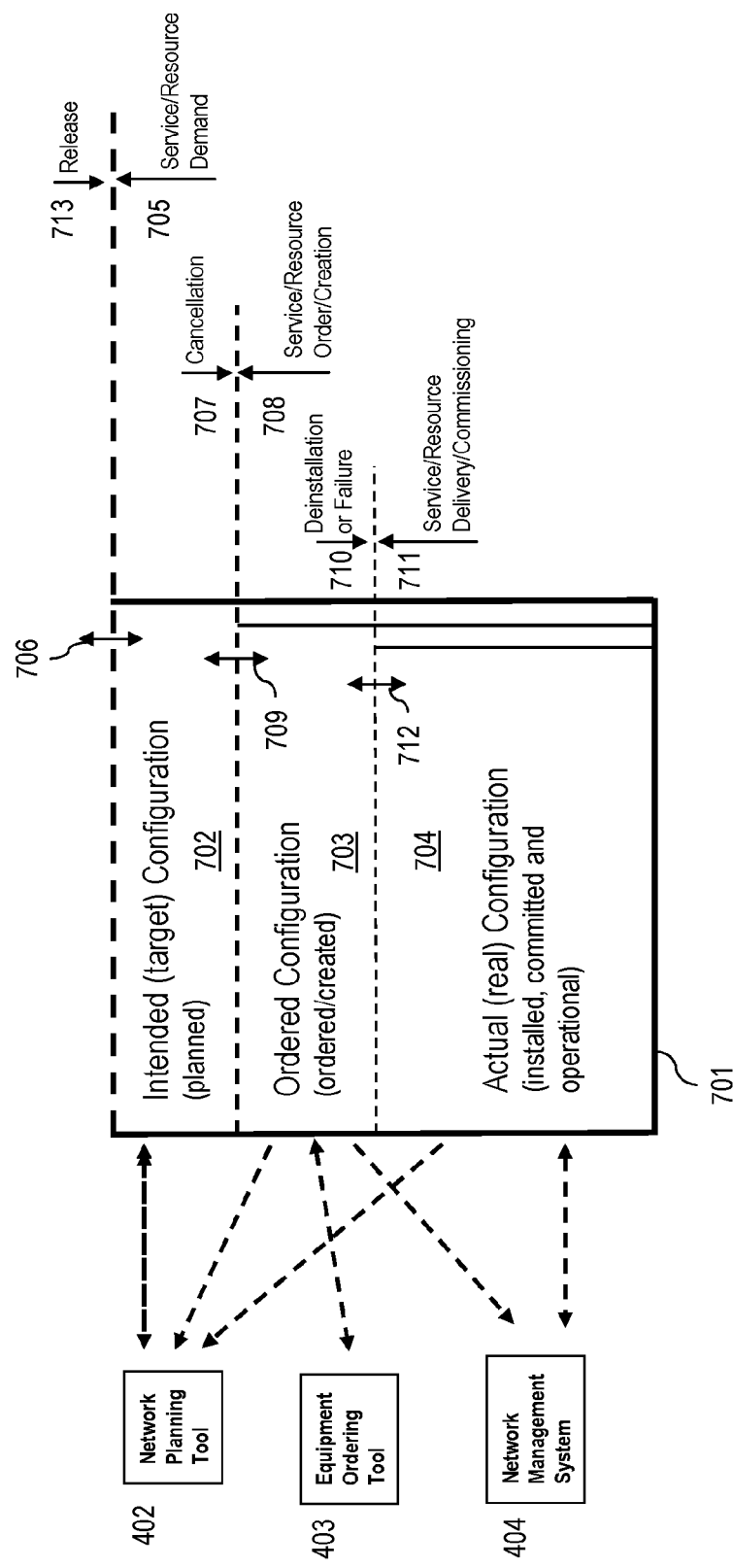
FIG. 7 shows a diagram schematically visualizing the relationship between the different views or portions of the system database.

FIG. 7 shows a diagram schematically visualizing the relationship between the different views 501 to 503 or the content of the databases 601 to 603.

A content 701 of the system database (deployed centrally or in a distributed fashion) comprises an intended (target) configuration 702 as planned, an ordered configuration 703 and an actual (real) configuration 704, which is installed and operational.

The network planning tool 402 obtains information from all configurations 702 to 704 and supplies information to the intended configuration 702. The equipment ordering tool 403 obtains information from the ordered configuration 703 and supplies information to this ordered configuration 703. The network management system 404 obtains information from the ordered configuration 703 and from the actual configuration 704 and supplies information to the actual configuration 704.

The network planning tool 402 may convey a "release" event 713 or a "service and/or resource" demand 705 to the intended configuration 702, which changes the status and content of the intended configuration 702 (indicated by an arrow 706).

The equipment ordering tool 403 may convey a "cancellation" event 707 or a "service and/or resource order or creation" demand 708 to the ordered configuration 703, which changes the status and content of the ordered configuration 703 (indicated by an arrow 709).

The network management system 404 may convey a "de-installation or failure" event 710 or a "service and/or resource delivery or commissioning" event 711 to the actual configuration 704, which changes the status and content of the actual configuration 704 (indicated by an arrow 712).

It is noted that the intended configuration 702 comprises the ordered configuration 703 and the actual configuration 704 and that the ordered configuration 703 comprises the actual configuration 704.

It is further noted that the communication network can be changed in both directions. In case the communication network needs to shrink, e.g., in case a planned configuration falls below an ordered configuration or below an actual configuration, installed equipment may be automatically decommissioned, e.g., due to power-saving reasons. Also, a pending order can be cancelled or a de-installation can be triggered.

Figure 8:
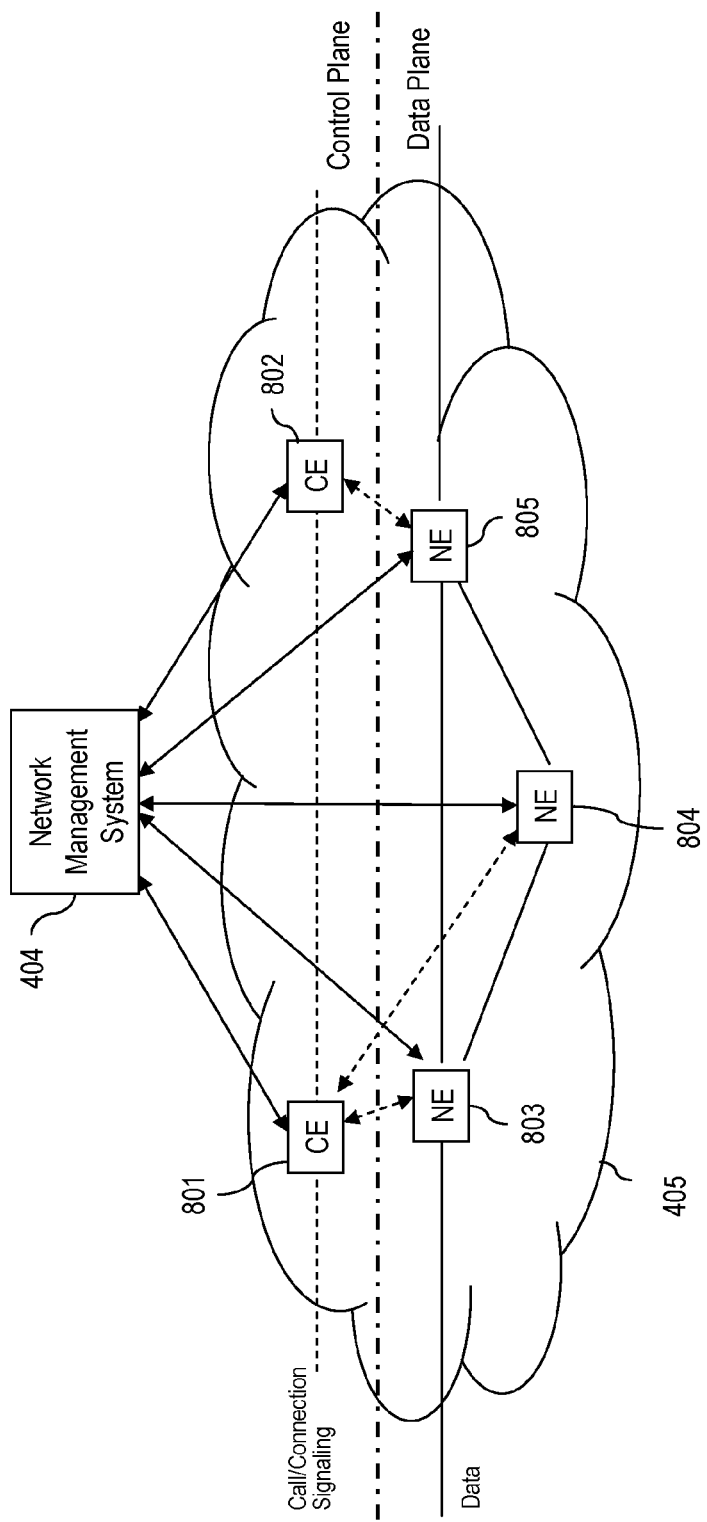
FIG. 8 shows the network management system in combination with the control plane and the data plane of the communication network.

FIG. 8 shows a diagram comprising the part of the communication network 405 and the network management system 404 also shown in FIG. 4.

The communication network 405 comprises control elements CEs (elements of the control plane) 801 and 802. It is noted that as an option, only a single CE can be provided. In addition, several network elements NEs 803 to 805 are provided, which are associated with a data plane. As an example, the CE 801 can communicate with the network management system 404 and with the NEs 803 and 804. The CE 802 can communicate with the network management system 404 and with the NE 805. The NEs 803 to 805 are connected to the network management system 404.

Data can be conveyed via the NEs 803 to 805 and call and/or connection signaling information (also service requests from the user and/or from the network management system) are conveyed via the CEs 801, 802 of the control plane.

It is noted that the CEs 801, 802 may communicate with each other using the data plane; i.e. the control plane (from a logical perspective) utilizes the data plane for communication purposes; in other words, the communication service provided by the data plane can be used in a transparent manner by the control plane.

It is further noted that not each NE may have to communicate with a CE or with the network management system 404. For example intermediate network elements utilized for conducting a path reservation on a NE-by-NE basis (according to, e.g., a Resource Reservation Protocol (RSVP)) may not have to provide information to the NE or to the network management system.

The NE may indicate a lack of resource to the network management system 404 or the CE may indicate to the network management system 404 that a service is not available. The network management system 404 may then forward such information to the system database 401 and/or directly to the network planning tool 402.

It is noted, however, that the complete communication network may comprise the portion of the network 405 as well as the network management system 404 and the components shown in FIG. 4 above.

Figure 9:
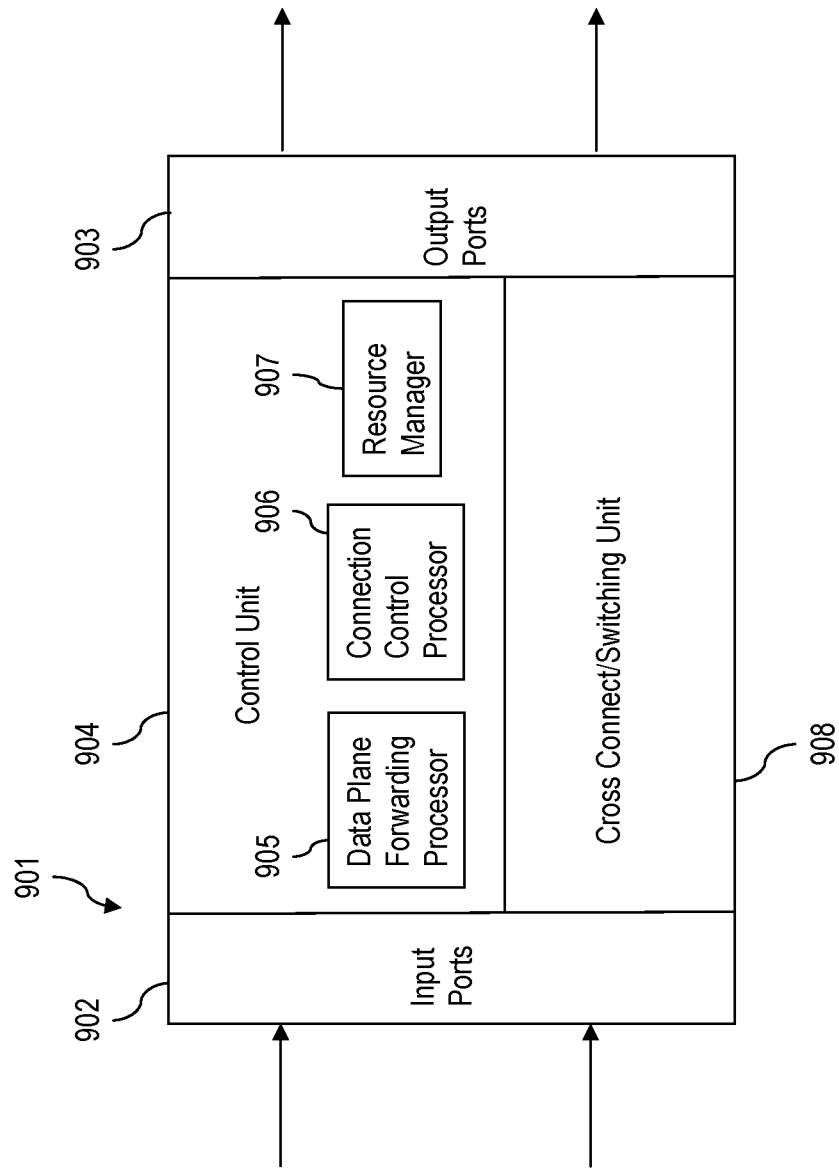
FIG. 9 shows a schematic block diagram of a network element (NE) comprising input ports, output ports, a control unit and a cross connect/switching unit, wherein the control unit further comprises a data plane forwarding processor, a connection control processor and a resource manager.

FIG. 9 shows a schematic block diagram of a network element (NE) comprising input ports 902, output ports 903, a control unit 904 and a cross connect/switching unit 908. The control unit 904 further comprises a data plane forwarding processor 905, a connection control processor 906 and a resource manager 907.

The data plane forwarding processor 905 assigns physical resources of the data plane, e.g., wavelengths, to a WDM cross connection and also provides header analysis and routing functionalities for data packets. The connection control processor 906 conducts the control plane communication.

The resource manager 907 manages the resources of the network element 901. It may allocate resources that are not yet provided and arbitrates competing requests between the network management system providing, e.g., infrastructure services and the control plane, handling, e.g., user calls. As an option, the resource manager 907 may directly inform the network management system (see FIG. 8) about resource deficiencies.

The cross connect/switching unit 908 handles traffic of the data plane.

Figure 10:
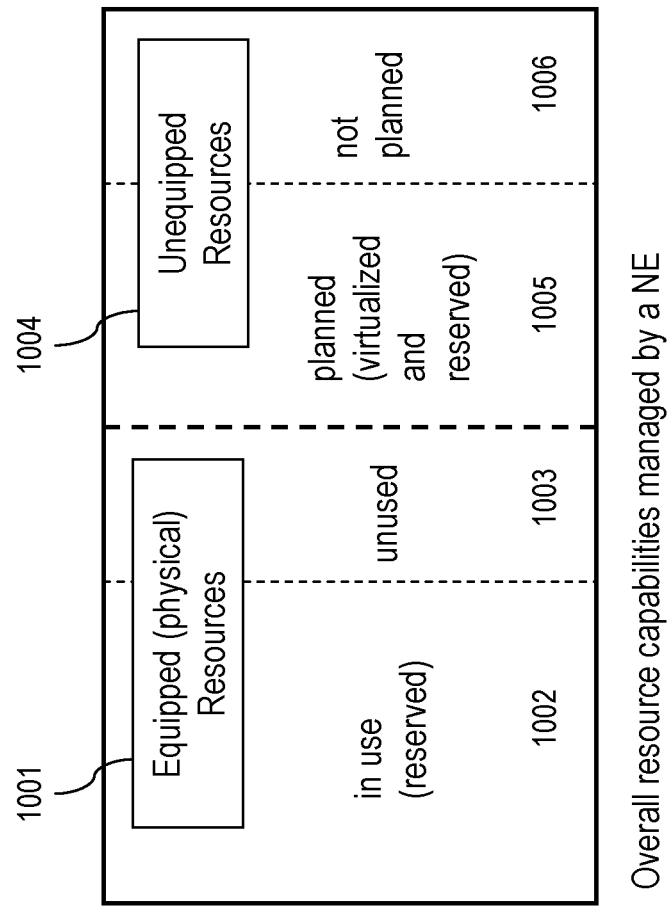
FIG. 10 shows a schematic block diagram visualizing resource capabilities of a network element.
Figure 11:
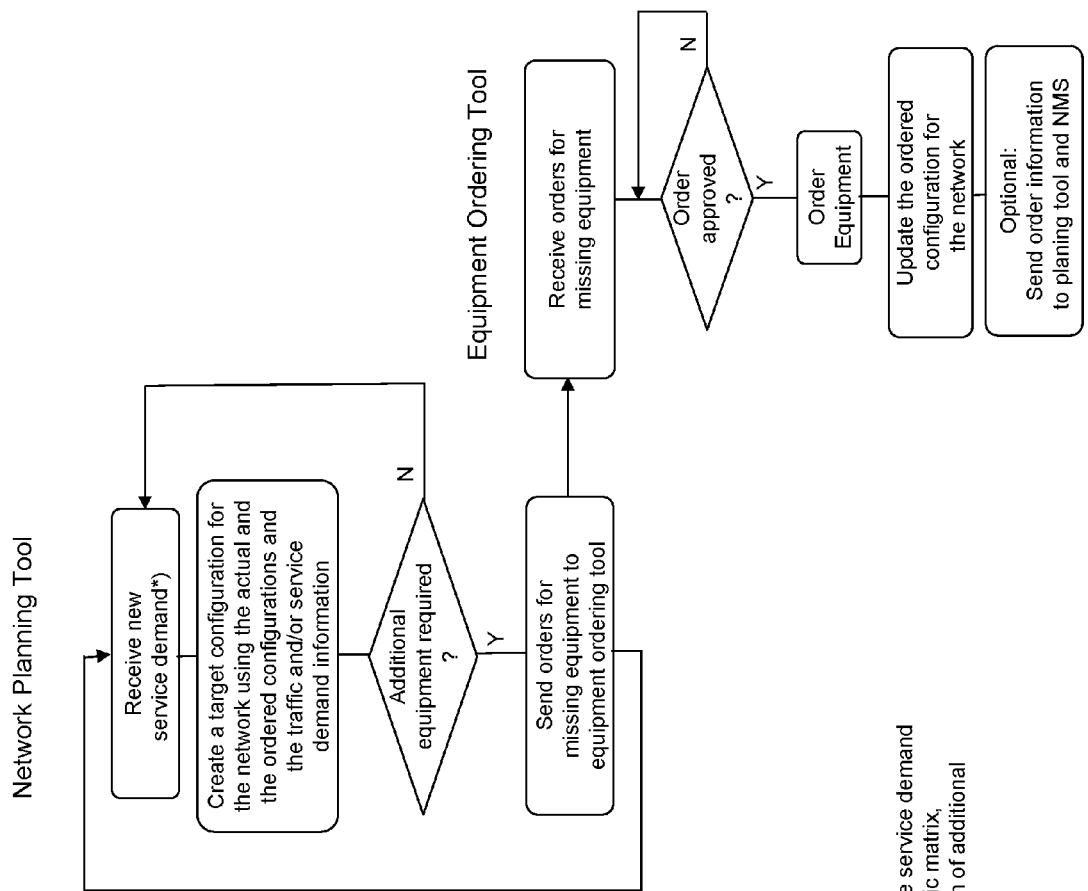
FIG. 11 shows the activities of the network planning tool and the equipment ordering tool and their interaction.

FIG. 10 shows a schematic block diagram visualizing resource capabilities of a NE. The NE has equipped, physically available and accessible resources 1001 that are either in use 1002 (reserved) or unused 1003.

Also, the NE comprises space for unequipped resources 1004, which are not yet physically available. The unequipped resources 1004 can be subdivided into planned (i.e. virtualized and reserved) resources 1005 and not planned (free) resources 1006.

Advantageously, the NE is aware of its degree of utilization, i.e. its equipment status. Hence, the NE may know which amount of resources are of type 1002, 1003, 1005 or

1006. Hence, it is feasible to allocate the unequipped resources 1004 in advance and trigger an order for an equipment to be placed in this allocated space. As described above, the order takes some time for delivery and once it is delivered, it may be placed into the spot reserved and activated. The service may then become active without further unnecessary delay.

LIST OF ABBREVIATIONS

CAPEX Capital Expenditure
CC Cross Connection
CP Control Plane
DB Data Base
DWDM Dense Wavelength Division Multiplexing
GMPLS Generalized Multi Protocol Label Switching
Item-No Item Number
LSP Label switched path
NE Network Element
NMS Network Management System
OPEX Operational Expenditure
SNR Serial number
XML Extensible Mark-up Language

The invention claimed is:

1. A method for service provisioning in an optical communication network comprising optical fibers and network elements, said service using switching and transmission resources to form a communication channel used by the service to convey information from one point to another point in, or at the edge of the optical communication network, or across network boundaries towards other networks,
   creating a planned resource to be installed in a network element of the optical communication network as a virtual resource and reserving for a dedicated service in the network element, which planned resource is an unequipped resource not yet physically available for productive use by the network, and wherein said resource is one of a link, a network node, a channel, a bandwidth or a wavelength,
   wherein said virtual resource is presented to a network element interface like an installed resource, but with a different state expressing that the virtual resource is not yet physically available, thereby permitting that the virtual resource is handled by a network management system like an installed resource, and permitting creation of a virtual cross connection using such virtual resource, which virtual cross connection to be immediately activated by the network element as soon as said planned resource is installed.

2. The method according to claim 1, wherein the service is configured based on a request; and based on the service configuration the resource is created as a virtual resource and reserved for said service.

3. The method according to claim 1, wherein an order equipment request is issued based on a physical resource identified as being not yet available.

4. The method according to claim 3, wherein upon delivery of the equipment ordered,
   the equipment is installed; and
   the service is activated.

5. The method according to claim 4, wherein the resource is configured via a system database.

6. The method according to claim 5, wherein upon availability of the resource, the entry of the system database regarding the resource is used to configure the installed equipment.

7. The method according to claim 1, wherein a request for provisioning of the virtual resource is issued and depends on a demand.

8. A device comprising a processor that executes instructions to perform service provisioning in an optical communication network comprising optical fibers and network elements, wherein the service uses switching and transmission resources to form a communication channel used by the service to convey information from one point to another point in, or at the edge of the optical communication network, or across boundaries towards other networks,
   said processing executing instructions for:
      creating a planned resource to be installed in a network element of the optical communication network as a virtual resource and reserving for a dedicated service in the network element, which planned resource is an unequipped resource not yet physically available for productive use by the network, and wherein said resource is one of a link, a network node, a channel a bandwidth or a wavelength,
      wherein said virtual resource is presented to a network element interface like an installed resource, but with a different state expressing that the virtual resource is not yet physically available, thereby permitting that the virtual resource is handled by a network management system like an installed resource, and permitting creation of a virtual cross connection using such virtual resource, which virtual cross connection to be immediately activated by the network element as soon as said planned resource is installed.

9. A network element to use in an optical network, said network element comprising input ports for inputting optical signals, output ports for outputting optical signals, a control unit having one or more processors for executing instructions and coupled to a storage and cross connect/switching, said one or more processors of said control unit executing instructions for creating a planned resource to be installed in said network element as a virtual resource and reserving the same for a dedicated service in the network element which planned resource is an unequipped resource not yet available for productive use by a network, wherein said resource is one of a link, a network node, a channel, a bandwidth or wavelength,
   wherein said virtual resource is presented to a network element interface like an installed resource but with a different state expressing that the resource is not yet physically available, thereby permitting that the virtual resource is handled by a network management system like an installed resource and permitting creation of a virtual cross connection using such virtual resource, which virtual cross connection is immediately activated by the network element as soon as said planned resource is installed.

* * * * *